Nov. 28, 1939.   C. E. HAWK   2,181,810
GLASS BLOCK TRIMMER
Filed Jan. 21, 1939
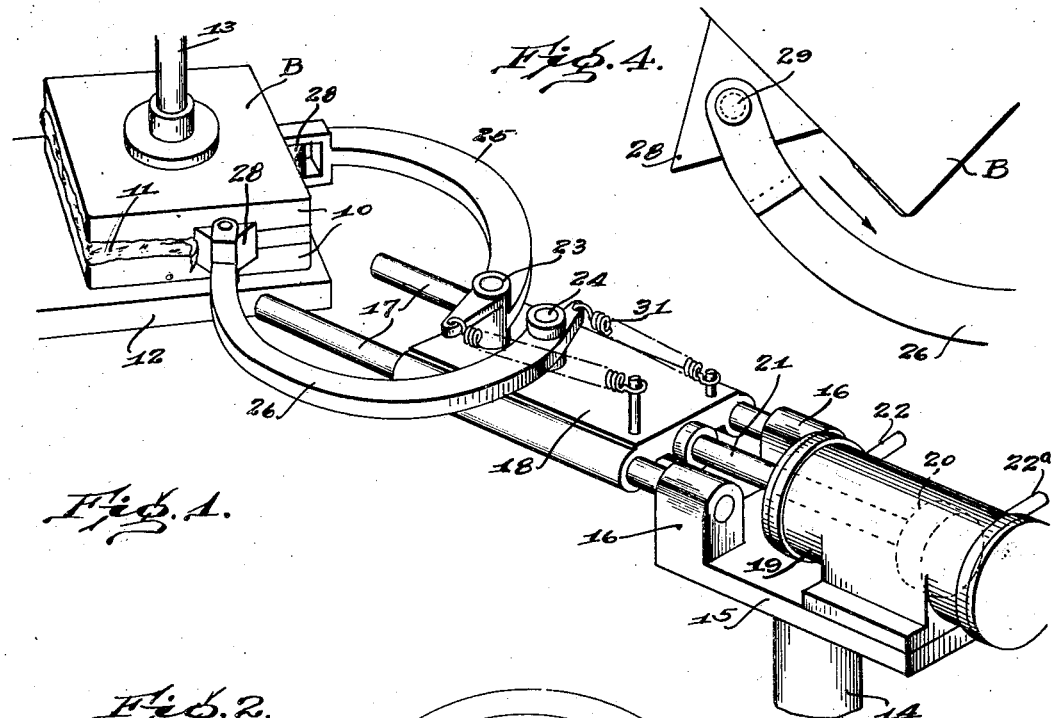
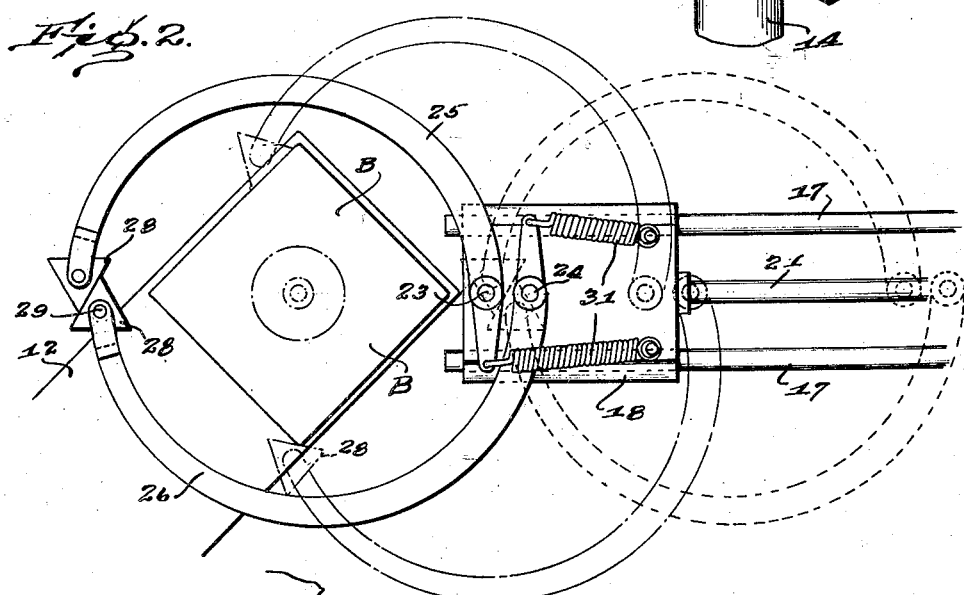
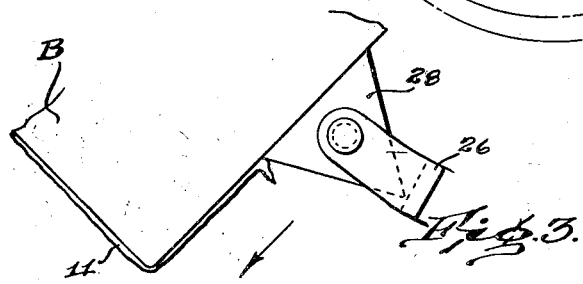
Charles E. Hawk
INVENTOR.
BY Rule & Hoge
ATTORNEYS.

Patented Nov. 28, 1939

2,181,810

UNITED STATES PATENT OFFICE 2,181,810

GLASS BLOCK TRIMMER

Charles E. Hawk, Muncie, Ind., assignor to Owens-Illinois Glass Company, a corporation of Ohio Application January 21, 1939, Serial No. 252,141

11 Claims. (Cl. 90—24)

The improved trimming device comprising the present invention is primarily adapted for use in removing excess bonding material from the sides of hollow glass building blocks in the vicinity of the meeting edges of the block sections. The device may, however, with or without modification, be employed for removing excess material from various geometrical shapes or figures regardless of the specific contour thereof.

The principal object of the invention is to provide an automatic device of the character set forth above which may be positioned with respect to a block support and caused to operate on a block supported thereon in such a manner that all of the excess bonding material adhering to the block sides in the vicinity of the meeting edges of the block will be sheared from the block efficiently and neatly, leaving the block in a finished condition.

Other objects of the invention, not at this time enumerated, will become apparent hereinafter.

In the accompanying drawing:

Fig. 1 is a perspective view of the device showing the same operatively associated with a block and support therefor;

Fig. 2 is a fragmentary top plan view of the device diagrammatically illustrating the manner in which all four sides of a block are treated by the shearing cutters;

Fig. 3 is an enlarged fragmentary top plan view of a block with one of the cutters positioned thereagainst and moving in one direction during the advance stroke thereof; and Fig. 4 is a fragmentary view similar to Fig. 3 showing the cutter moving in the opposite direction during the return stroke thereof.

Referring now specifically to the drawing, a partially completed hollow glass building block B comprised of complementary half-sections 10 which are bonded together along their meeting edges by a suitable bonding material 11 such as an aluminum alloy is mounted upon a support 12 and held firmly thereon by means of a pressing ram 13. Preferably the block B is placed on the support 12 while it is still hot from the molding operations by means of which the sections 10 were formed and consequently the bonding material 11, an excess of which occurs at the block seam, is relatively soft and susceptible to removal operations.

The trimming device includes a support or column 14 which carries at its upper end a rectangular plate 15 having formed thereon a pair of upstanding ears 16 from which there project outwardly and forwardly a pair of parallel guide bars 17. The guide bars 17 terminate in the vicinity of the support 12 adjacent one corner thereof and on opposite sides of the corner. Slidably mounted on the guide bars 17 is a block or carriage 18 through which the guide bars extend.

The carriage 18 is movable from a position adjacent the plate 15 forwardly on the guide bars 17 to a position adjacent the support 12 as shown in Fig. 2. A cylinder 19 mounted on the plate 15 has a piston 20 therein which is connected to the movable carriage by means of a piston rod 21. Conduits 22 and 22$^a$ leading to the opposite ends of the cylinder 19 provide for the admission of motive fluid such as compressed air to the cylinder to actuate the piston 20 therein and reciprocate the carriage 18 on the guide bars 17.

A pair of pins 23 and 24 extend upwardly from the upper surface of the carriage 18 at adjacent points thereon and have pivoted thereto curved arms 25 and 26 respectively. The arms 25 and 26 are substantially semi-circular in design, are bowed outwardly with respect to each other, and each is of a radius of curvature somewhat in excess of one-half the horizontal diagonal of the block sections in order that the two arms 25 and 26, when closed upon each other as shown in full lines in Fig. 2, may encircle the block and completely encompass the same. The free end of each arm 25 and 26 is bifurcated as at 27 and a pair of scrapers or cutters 28 are rotatably mounted on pins 29 that extend across the furcations of the arms. Each cutter is pentahedral in form and triangular in crosssection and is provided with three cutting edges and three wiping or smoothing surfaces. The width of each cutter is slightly in excess of the width of the band of excess bonding material extending around the block. The arms 25 and 26 are of such lengths that they may be swung to the closed position illustrated in full lines in Fig. 2 with the cutters 28 in engagement. This, the normal position of the arms, is maintained by means of coil springs 31 which are connected to extensions 32 formed on the arms and anchored to pins 33 that extend upwardly from the upper surface of the carriage 18.

In the operation of the device, after an unfinished block B, the sections 10 of which have been bonded together by bonding material, is placed upon the support 12 and the pressing ram 13 has been applied thereto to hold the block against dislodgement, air is admitted to one end of the cylinder 19 to drive the piston 20 therein forwardly and move the carriage 18 outwardly on the guide bars 17. The carriage 18 is thus moved toward the block B and the forward corner of the latter enters between the two cutters 29 and spreads the arms 25 and 26 apart against the influence of the coil springs 31. One flat wiping face of each cutter engages the band of excess bonding material and one cutting edge thereof removes the excess bonding material as the cutters pass around the block in opposite directions. The flat wiping faces of the cutters which engage the bonding material directly behind the cutting edges serve to iron or smooth the material against the plane surfaces of the block.

As the carriage 18 continues to be moved forwardly, the cutters 28 pass around the outer corners of the block as shown in dotted lines in Fig. 2. In so passing around these corners a degree of unstable equilibrium of the cutters on their pivot pins 29 occurs and the cutters pass over a dead center point and tilt on the pins and assume a cutting relationship with respect to the rear faces of the block at the seam thereof. Continued movement of the carriage forwardly results in a movement of the cutters along the rear faces of the block inwardly toward each other.

After the carriage 18 has moved to its fully advanced position a major portion of the excess bonding material will have been removed from the block seam and the cutters will have moved clear of the block and will occupy positions in engagement with each other as shown in Fig. 2. A small area of excess bonding material on opposite sides of the corner first contacted by the cutters will remain on the block inasmuch as the cutting edges of the cutters do not engage the bonding material exactly at this corner. Similarly, a small area of the material will remain on the rear sides of the block directly behind the opposed outer corners of the block inasmuch as during tilting of the cutters in the manner previously described, the cutting edges thereof leave the seam momentarily.

In order to completely remove all of the excess bonding material remaining on the block seam after the carriage has ben moved to its extreme forward position, air is admitted to the cylinder 19 to drive the piston 20 therein rearwardly and draw the carriage 18 inwardly on the guide bars 17 and restore the same to its initial position. The carriage 18 is thus moved away from the block B and the rear corner of the latter enters between the two cutters and spreads the arms 25 and 26 apart. The cutters in passing around the block while traveling toward the forward corner of the latter, engage the material remaining on the seam and remove the same completely after which they assume their initial position in engagement with each other preparatory to substitution of another unfinished block on the support 12.

Modifications may be resorted to within the spirit and scope of the appended claims.

I claim:

1. The combination with a support adapted to receive thereon a sectional article, the sections of which are bonded together by a bonding material, and means for maintaining the article immobile thereon, of means for removing excess bonding material from the article comprising a carriage movable toward and away from the support, a pair of cutters mounted on the carriage for movement toward and away from each other, means yieldingly urging the cutters into a position of engagement, and means for moving the carriage.

2. The combination with a support adapted to receive thereon a sectional article, the sections of which are bonded together by a bonding material, and means for maintaining the article immobile thereon, of means for removing excess bonding material from the article comprising a carriage movable toward and away from the support, a pair of cutters mounted on the carriage for movement toward and away from each other, spring means yieldingly urging the cutters into a position of engagement, and means for moving the carriage.

3. The combination with a support adapted to receive thereon a sectional article, the sections of which are bonded together by a bonding material, and means for maintaining the article immobile thereon, of means for removing excess bonding material from the article comprising a carriage movable toward and away from the support, a pair of independently rotatable cutters mounted on the carriage for movement bodily toward and away from each other, spring means yieldingly urging the cutters into a position of engagement, and means for moving the carriage.

4. The combination with a support adapted to receive thereon a sectional article, the sections of which are bonded together by a bonding material, and means for maintaining the article immobile thereon, of means for removing excess bonding material from the article comprising a carriage movable toward and away from the support, a pair of arms pivoted to the carriage for swinging movement in a horizontal plane toward and away from each other, cutters mounted on the arms and movable upon swinging movement of the latter toward each other into engagement, means normally urging said arms toward each other to bring the cutters into engagement, and means for moving the carriage.

5. The combination with a support adapted to receive thereon a sectional article, the sections of which are bonded together by a bonding material, and means for maintaining the article immobile thereon, of means for removing excess bonding material from the article comprising a carriage movable toward and away from the support, a pair of outwardly bowed arms pivoted to the carriage for swinging movement in a horizontal plane toward and away from each other, said arms being adapted when the carriage is in a position of close proximity to the support to encompass the article supported thereon, cutters mounted on the arms and movable upon swinging movement of the latter toward each other and into engagement, spring means urging said arms toward each other to bring the cutters into engagement, and means for moving the carriage.

6. The combination with a support adapted to receive thereon a sectional article, the sections of which are bonded together by a bonding material, and means for maintaining the article immobile thereon, of means for removing excess bonding material from the article comprising a carriage movable toward and away from the support, a pair of outwardly bowed arms pivoted to the carriage for swinging movement in a horizontal plane toward and away each other, said arms being adapted when the carriage is in a position of close proximity to the support to encompass the article supported thereon, cutters pivoted to the arms and movable upon swinging movement of the latter bodily toward each other and into engagement, spring means urging said arms toward each other to bring the cutters into engagement, and means for moving the carriage.

7. The combination with a support adapted to receive thereon a sectional article, the sections of which are bonded together by a bonding material and means for maintaining the article immobile thereon, of means for removing excess bonding material from the article including a carriage moveable toward and away from the support, an arm pivoted to the carriage for swinging movement in a horizontal plane, a cutter mounted on the arm and movable upon swinging movement of the latter in one direction into engagement with the article, a spring normally urging the arm in a direction to cause the cutter to engage the article, and means for reciprocating the carriage.

8. In combination, a support, means for clamping an article on the support, a carriage movable toward and away from the support, means for reciprocating the carriage, a pair of outwardly bowed arms pivoted to the carriage for swinging movement in a horizontal plane toward and away from each other, a cutter mounted for rotation at the outer end of each arm, and means normally urging said arms toward each other.

9. In combination, a support, means for clamping an article on the support, a carriage, means for moving the carriage and support relative to each other to increase and decrease the distance therebetween, a pair of outwardly bowed arms pivoted to the carriage for swinging movement in a horizontal plane toward and away from each other, and a cutter mounted for rotation at the outer end of each arm.

10. In combination, a support, means for clamping an article on the support, a carriage, means for moving the carriage and support relative to each other to increase and decrease the distance therebetween, a pair of outwardly bowed arms pivoted to the carriage for swinging movement in a horizontal plane toward and away from each other, and a cutter mounted for rotation at the outer end of each arm, said cutter being of pentahedral formation and triangular in cross-section.

11. A cutter for removing excess bonding material from the surfaces of partially finished hollow glass building blocks in the vicinity of the meeting edges thereof, comprising a pentahedral body of heat resisting material which is triangular in cross-section and is possessed of one pair of parallel sides, and a pivot pin extending through the body perpendicular to said parallel sides and by means of which the body may be rotatably supported when the cutter is in use.

CHARLES E. HAWK.